(No Model.)
S. UDSTAD.
ROD PACKING.
No. 401,984. Patented Apr. 23, 1889.
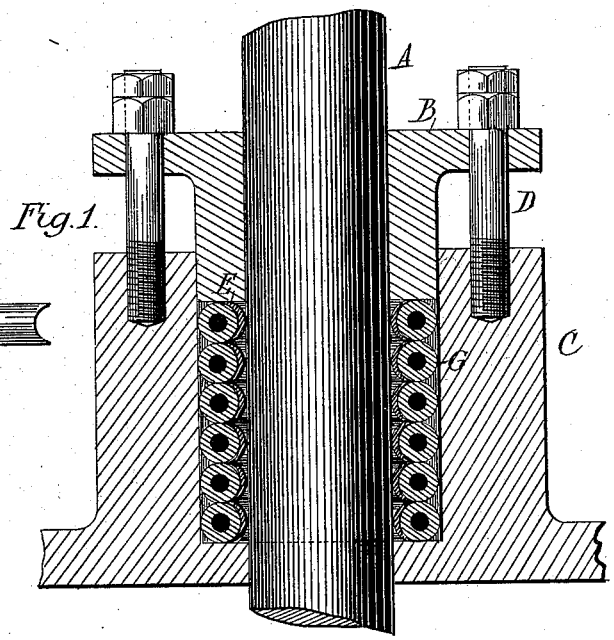
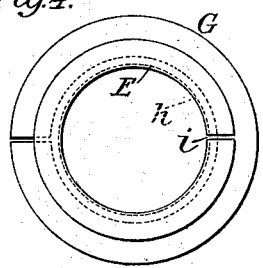
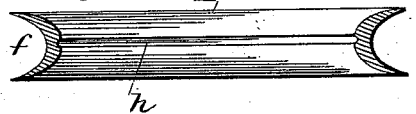
Witnesses,
Will T. Norton
L. W. Seely
Inventor
Sivert Udstad
By his Attorneys
John J. Halsted

UNITED STATES PATENT OFFICE.

SIVERT UDSTAD, OF AURORA, ILLINOIS.

ROD-PACKING.

SPECIFICATION forming part of Letters Patent No. 401,984, dated April 23, 1889.

Application filed August 30, 1888. Serial No. 284,130. (No model.)

*To all whom it may concern:*

Be it known that I, SIVERT UDSTAD, of the city of Aurora, in the county of Kane and State of Illinois, have invented certain new and useful Improvements in Packing for Piston-Rods, Valve-Stems, &c.; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to a special construction of metal packing, having for its objects the better insuring of a steam-tight fit around the rod and an effective means for compensating for wear, and it will be readily understood from the following.

In the drawings, Figure 1 illustrates a sectional view of a stuffing-box with my improved devices, partly in section, applied thereto; Fig. 2, a view of one of the grooved metal packing-rings; Fig. 3, an end view of a cylindrical piece of elastic composition or rubber packing adapted for the groove of the rings; Fig. 4, a plan of one of the metal rings with the composition or rubber packing lodged in its groove; Fig. 5, a cross-section, enlarged, of one of the metal rings before wear and compression; and Fig. 6, a similar view after compression and flattening.

A represents a piston-rod, (or valve-stem;) B, the gland of the stuffing-box; C, the stuffing-box, and D the gland-bolts for connecting the gland with the box and for forcing the gland against the packing. These parts A B C D are substantially as heretofore used, and are not herein claimed as new, my invention residing in the special character of the packing devices, which I shall now particularly describe.

The metal rings E, which constitute an essential part of my packing, are made as follows: They are preferably made from the well-known composition called "Babbitt metal," and have a large exterior groove, *f*, to receive the compound or rubber composition packing-ring G, which is cylindrical in its cross-section, as shown, and also has a small groove, *h*, on its inner or convex side, as shown, this small groove *h* serving not only to form what may be called a "water-packing," because of its receiving and holding the water of condensed steam which fills the groove, but also serving (as will presently be more fully set forth) to permit the more ready flattening of the interior surface of the metal rings and the decrease of their inner diameters to compensate for wear, and thus at will to always keep them in close contact with the piston or other rod. The diameter of the packing G is substantially the same as that of a circle, coinciding with the groove *f* in its cross-section, so that when this packing is lodged in this groove it projects beyond it to the extent of more than half its bulk. The thinner parts of the metal ring, therefore, do not come in contact with the wall of the stuffing-box, and the packing-ring is left free enough to be compressed and to expand outwardly. A piece of the rubber composition being cut long enough to encircle the metal ring, and being placed in its groove, and the several parts being then put together, as shown in Fig. 1, it will now be seen that when the bolts D are tightly screwed to give pressure to the gland the effect is to enlarge by compression the circle of the packing G by spreading it laterally, and thereby forcing it against the walls of the cavity of the stuffing-box and to decrease the diameter of the Babbitt rings E and force them into close contact with the piston-rod or other rod, A. Thus a perfectly-tight steam-joint is secured. It will now be seen that under the pressure given to the metal ring as above given the small groove *h* permits the ready flattening of the interior surface of the ring, because it allows the metal to spread from two opposite directions toward such groove without that resistance which would exist if the metal were ungrooved or solid at that center or crest-line of its transverse arch. This flattening and reduction of diameter may of course be continued from time to time as need be by giving more pressure through the agency of the bolts, so as to cause the rings E to hug the rod more closely.

The rings E may be cut through, as shown at *i* in Fig. 4, or may remain uncut, as preferred.

When the gland is advanced into position and the bolts or their nuts are screwed tight enough to prevent the leakage of steam, a most admirable tight steam-joint is the result, and it is found in actual practice that a few hours running will polish the rod like a mirror, and the friction is very far less—it is thought even seventy-five per cent. less—than with any fibrous packing known to me, besides outwearing it about four to one, besides being very cheap, strong, and durable. It may also be used upon a high-speed electric-light engine, where fibrous or rubber packing could not be made to work in direct contact with the piston or other rod.

Packing-rings have been made with a flat and ungrooved side to bear against the rod and having flaring edges at the opposite or outer side, which reach to and touch or nearly touch the stuffing-box; but I neither have nor claim any such construction. It will also be apparent that as the pressure upon the metal rings and also upon the rings G is increased from time to time by the pressure given to the gland B (which overlaps the metal rings and also compresses the rings G) this pressure, taken in connection with the groove $h$ and with the crescent form of the metal rings E, permits both rings to become more readily flattened and causes the rings E to hug the piston more closely upon increase of pressure.

I claim—

1. The metal packing-rings E of crescent form in cross-section, and having an annular groove, $h$, made centrally of its inner and convex side, combined with a stuffing-box and gland extending beyond the periphery of said rings, all as and for the purposes described.

2. In combination, the metal rings described, crescent shape in cross-section and provided with the annular groove $h$ at the crest of their convex inner sides, and the packing-rings having a cylindrical cross-section conforming substantially to the cross-section of the groove $f$, and whereby the packing shall project materially beyond the outer edges of the rings.

SIVERT UDSTAD.

Witnesses:
M. O. SOUTHWORTH,
E. T. PRINDLE.